Nov. 19, 1935.  E. WICKMAN  2,021,584
ASSEMBLING MACHINE
Filed July 30, 1932  3 Sheets-Sheet 1
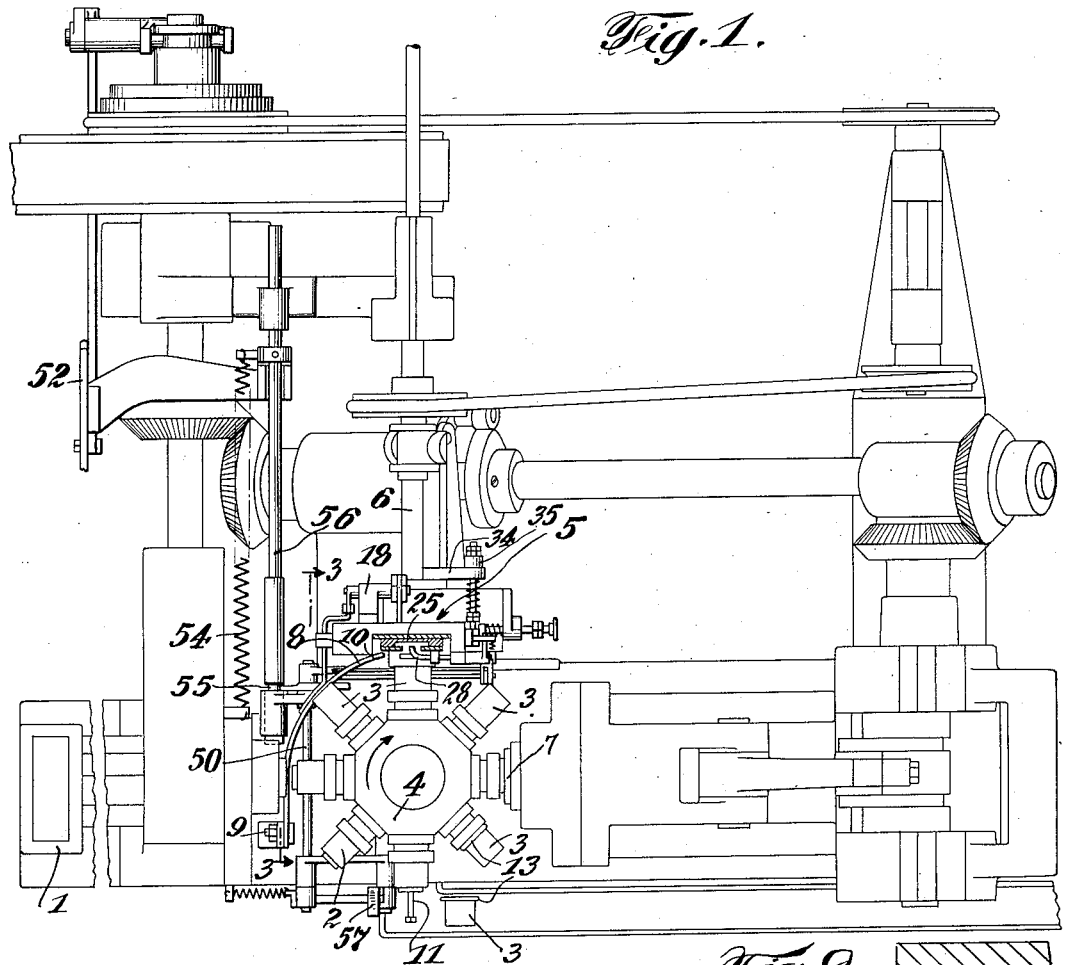
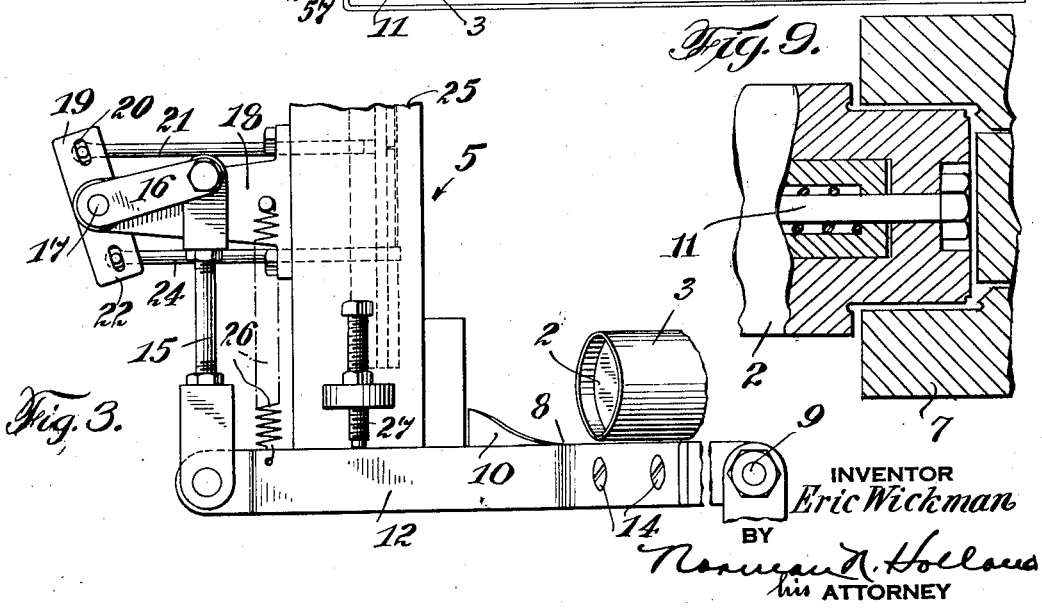
INVENTOR
*Eric Wickman*
BY
*Norman N. Hollow*
his ATTORNEY Nov. 19, 1935.　　　　E. WICKMAN　　　　2,021,584
ASSEMBLING MACHINE
Filed July 30, 1932　　　　3 Sheets-Sheet 2
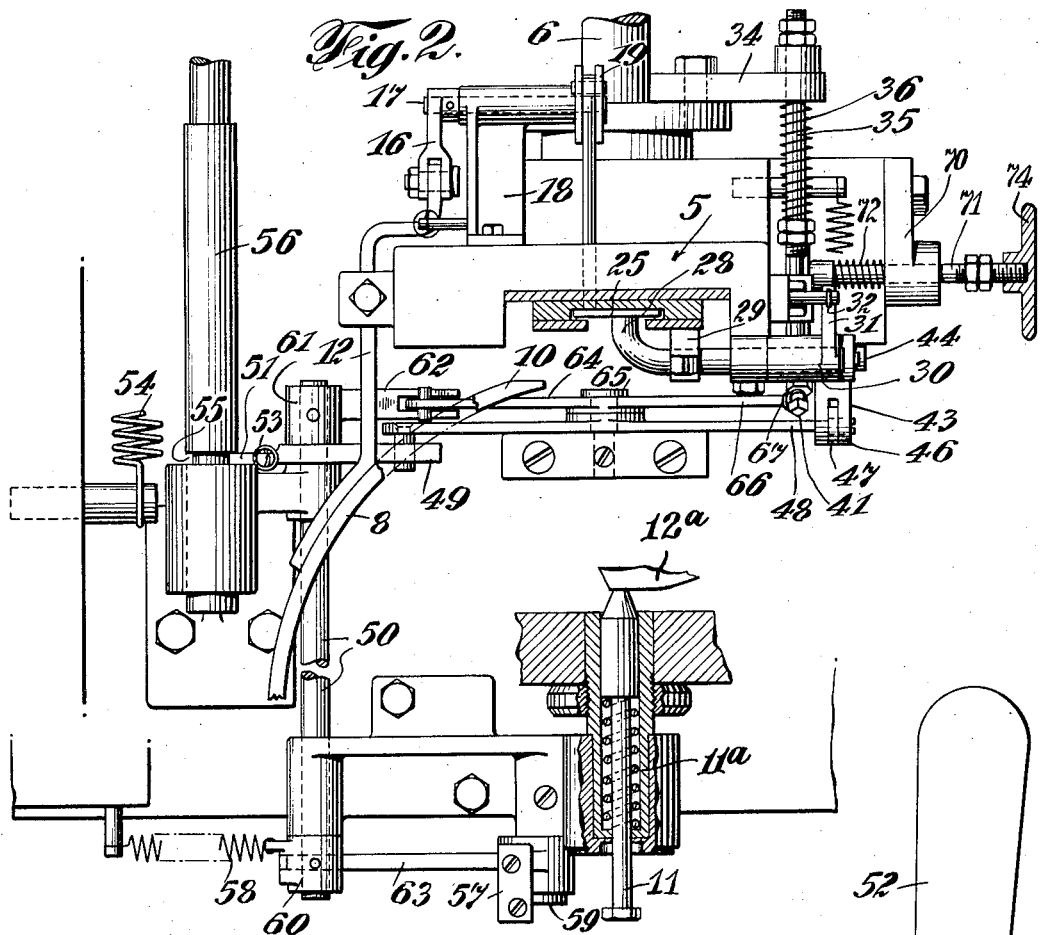
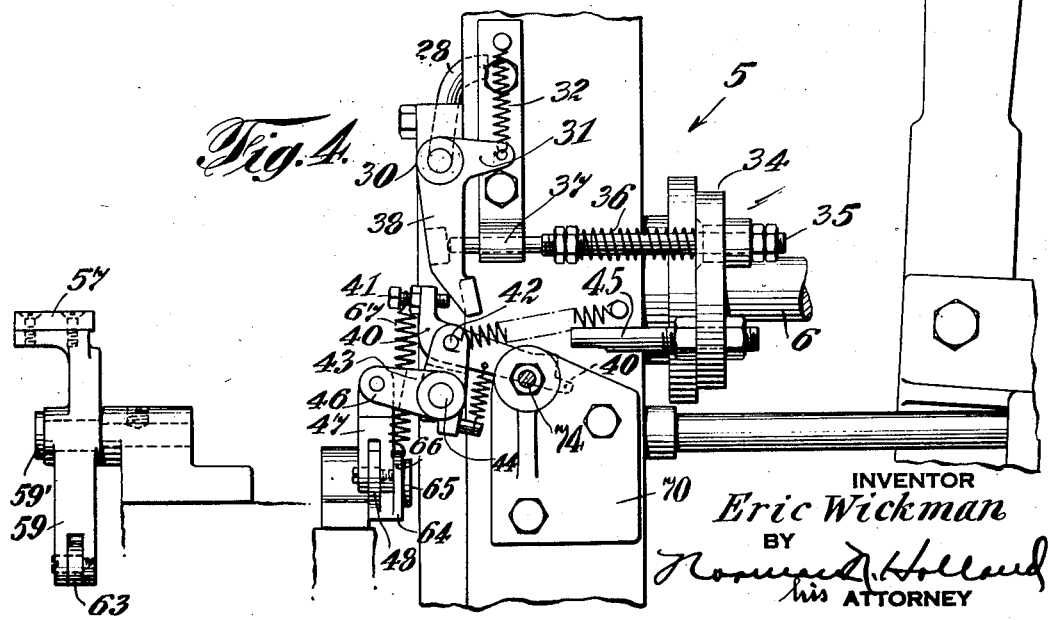
INVENTOR
Eric Wickman
BY
his ATTORNEY Nov. 19, 1935.  E. WICKMAN  2,021,584
ASSEMBLING MACHINE
Filed July 30, 1932   3 Sheets-Sheet 3
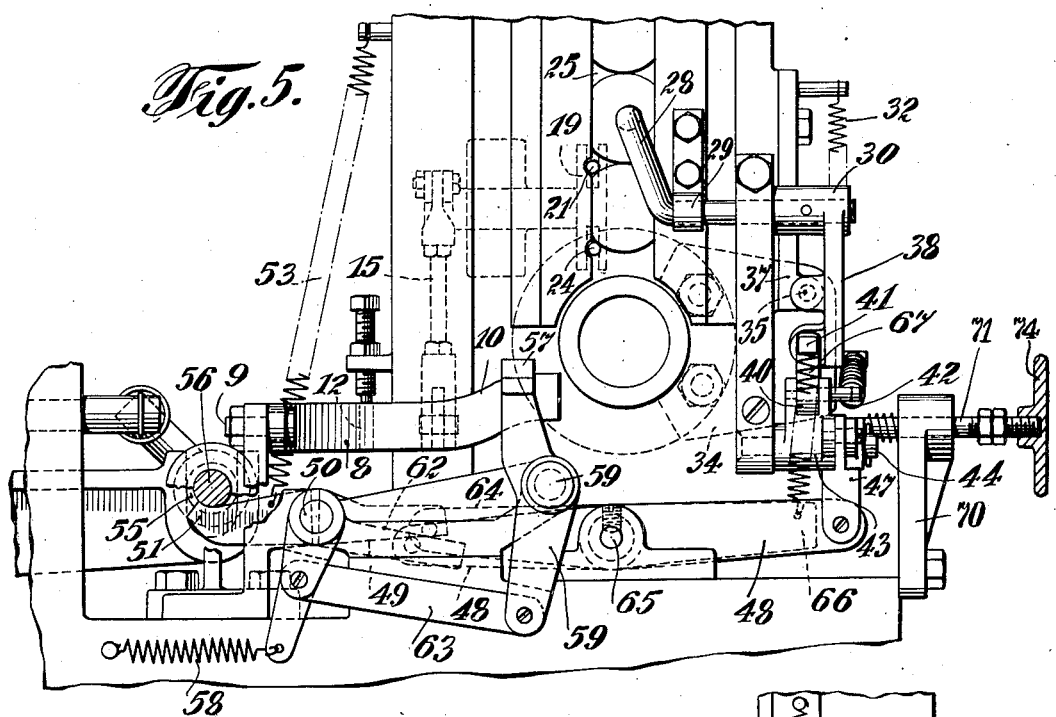
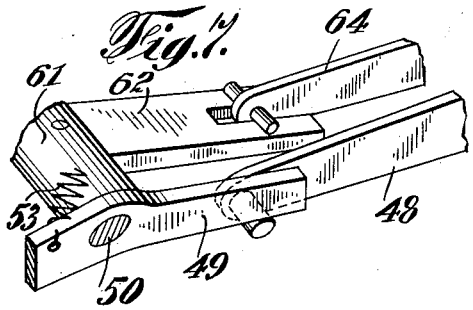
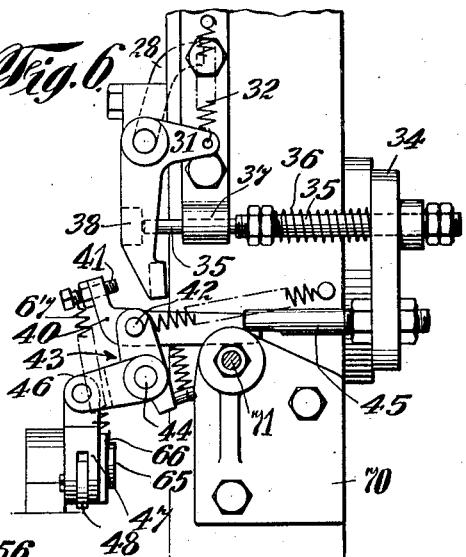
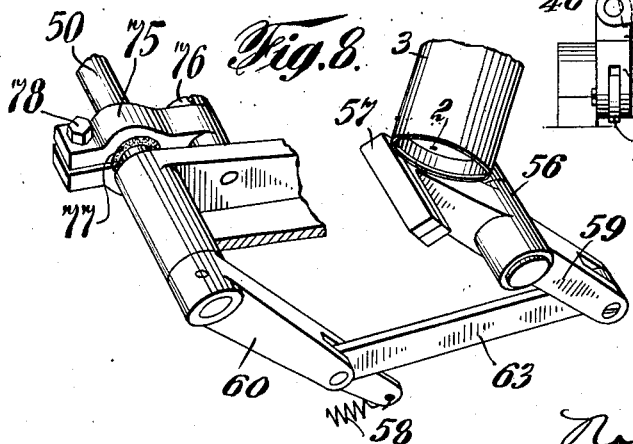
INVENTOR
*Eric Wickman*
BY
*Norman N. Holland*
his ATTORNEY

Patented Nov. 19, 1935

2,021,584

UNITED STATES PATENT OFFICE 2,021,584

ASSEMBLING MACHINE

Eric Wickman, Brooklyn, N. Y., assignor to Anchor Cap & Closure Corporation, Long Island City, N. Y., a corporation of New York Application July 30, 1932, Serial No. 626,945

20 Claims. (Cl. 113—1)

The present invention relates to the manufacture of articles such as closure caps, and particularly to a machine for assembling the parts of such articles.

In drawing metal to form flanged articles such as closure caps, the drawing operation, particularly where the flange is of substantial width, fractures the coating on the flange and mars the appearance of the article. For this reason, articles such as ketchup caps, small cans, and the like, are made by seaming together the body parts and the end parts by an interfolded seam. Various attempts have been made to draw articles of this kind, but the amount of drawing necessary fractures the coating to such an extent that the articles are less atractive than the two-piece articles. In fact, the two-piece closures are so far superior to the one-piece drawn closure that they have practically superseded the latter, and every effort has been made to produce the two-piece articles at the lowest possible price, because of the quantities sold. The operation of assembling the end part and the body part is a difficult one, requiring complicated machinery and accurate synchronization of operations. Machines of this class are now in use at the plant of the assignee of the present application, for assembling the end parts and body parts of ketchup caps. Essentially, the machine comprises a horn about which flat strips of metal are bent and seamed into cylindrical body parts, and a turret having members adapted to receive the body parts delivered by the horn. A button feeding mechanism delivers the button or end parts to be assembled with the body parts, and a chuck forms the interfolded seam between the two. Thereafter, an ejector discharges the assembled articles.

One of the difficulties with such a machine is that, in certain cases, the horn mechanism fails to deliver a body part and as the body receiving member moves without a body part, a cap is delivered to it and, of course, wasted. At other times, the button feeding mechanism fails to deliver a button and the body part is, of course, wasted. In addition, the ejector mechanism does not remove the body part because it engages the cover in removing the body part. Hence, the body receiving member, when it is presented to the horn again, already has a body part on it. The attempt to apply a second body part demolishes both bodies and, in some cases, breaks certain parts of the machinery. The result is that breakage is frequently encountered and much sheet metal is wasted, due to the failure of the parts to operate as they should.

The present invention aims to overcome the above difficulties by eliminating the waste, minimizing shut-downs, and eliminating breakage of the machine parts. While the invention is described with particular reference to the machine noted above, which is used at the present time for making ketchup caps, it will be understood that it is not intended to limit the invention to this particular machine, because many of its features may be utilized with other machines for making ketchup caps or articles of a similar nature, for example, certain types of cans.

An object of the present invention is to reduce the cost of manufacture of articles such as two-piece closure caps.

Another object of the invention is to provide an improved machine for making articles such as two-piece closure caps.

Another object of the invention is to minimize waste occasioned by the failure of the machine to assemble the parts.

Another object of the invention is to minimize the breakage of machine parts, due to failure of parts to operate properly.

Another object of the invention is to reduce to a minimum the period that a machine has to be shut down by reason of the failure of the parts to operate properly.

Another object of the invention is to advise the operator of the failure of the machine to operate properly.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a top plan view, illustrating a preferred embodiment of the invention applied to a machine particularly designed for assembling the parts of two-piece closure caps;

Fig. 2 is an enlarged top plan view of a portion of the machine, with parts broken away for clearness;

Fig. 3 is a sectional view, along the line 3—3 of Fig. 1, illustrating the preferred embodiment of the button feeding mechanism;

Fig. 4 is a side elevational view of the mechanism shown in Fig. 5, taken from the right side of Fig. 5, illustrating the mechanism for automatically operating the clutch to stop the machine under certain conditions;

Fig. 5 is a front elevational view of the parts shown in Fig. 4, taken from the left side of Fig. 4;

Fig. 6 is a view similar to Fig. 4, illustrating the parts in position to release the clutch for stopping the machine;

Fig. 7 is a perspective view of portions of the lever mechanism shown in Figs. 4, 5 and 6;

Fig. 8 is a perspective view of the preferred form of mechanism for stopping the machine when the body parts are not ejected; and Fig. 9 is a detailed sectional view illustrating the means for attaching the button to the body part, the cap being omitted for clarity.

Referring again to the drawings, and more particularly to Fig. 1, there is shown a machine which is used at the present time for manufacturing articles such as two-piece closure caps, the improvements upon the machine being designated in this figure in heavier lines. Since the machine is in use in the plant of the assignee, a detailed description of the parts not claimed herein, is not believed to be necessary but, sufficient description will be given to understand the present invention.

The machine receives flat decorated strips of metal cut from a sheet, and cup-shaped buttons stamped from a sheet, and assembles these into closure caps. The strips of metal are received in the magazine 1 and passed along a horn (not shown), which bends the strips into cylindrical forms and secures the ends together by an interfolded seam. The cylindrical body 3 is then delivered to one of the six members 2 on the turret 4, which is positioned at the delivery end of the horn. The turret 4 rotates step by step, in a clockwise direction, as indicated by the arrow in Fig. 1, until it is in alignment with the button feed mechanism 5, where the reciprocating rod 6 forces a button into the end of the body part, which protrudes outwardly beyond the end of the member 2. The body and button continue around to the reciprocating chuck 7 (see Fig. 9), which attaches the end of the body part to the button by means of an interfolded seam and, at the same time, curls the other end of the body part into a wire edge 13. The assembled cap passes around to the station, where an ejector 11 moves outward against the button of the cap and forces the body part off the member 2. The ejector remains in ineffective position at all stations except the discharge station where a cam 12a forces the ejector 11 outwardly against the button of the cap to remove the caps from the members 2. A suitable spring 11a (see Fig. 9) returns the ejector to its ineffective position. If, for any reason, the machine fails to attach a button to a body part on the member 2, the body part of the cap cannot be removed by the ejector from the member 2. It will be understood that these operations are continuous and rapid.

As pointed out above, considerable difficulty has been encountered by reason of the fact that the body forming mechanism fails, at intervals, to deliver a body to the member 2 of the turret. If a button is fed to a turret member having no body on it, the button is wasted and in the course of a day a number of buttons are wasted, which increases the cost of manufacture of the caps. Referring more particularly to Figs. 1, 2 and 3, a mechanism is shown for feeding buttons only to those members 2 of the turret which are presented with bodies on them. A preferred embodiment of the mechanism may comprise a curved member 8, pivoted at 9 with the curvature of the member having a radius substantially equal to the distance between the ends of the members 2 and the center of the turret. This curved member 8 extends between the body delivery station and cap feeding station. The bodies 3 on the members 2 extend outwardly beyond the ends of these members in order to permit the buttons to be inserted in the bodies. This protruding end of the body parts is utilized for engagement with the curved member 8, so that, as the member 2 passes from the body receiving station, the end of the body engages the member 8 and forces it downwardly by reason of the curved, raised end 10 thereof, shown more particularly in Fig. 3. If there is no body on the member 2, there is no protruding end and the curved member 8 is not operated by a passing member 2, hence, it does not operate the cap feeding mechanism. The curved member 8 (Figs. 2 and 3) may be attached to the cap feeding mechanism by a member or bar 12, bolted or otherwise attached to the curved member 8 at 14. The free end of the member 12 may be pivotally attached to a vertical rod 15 which, in turn, is pivotally attached to an arm 16 keyed to a shaft 17 mounted on a bracket 18. The shaft 17 has a member 19 keyed thereon, with a slot 20 in its upper end for attachment to a rod 21, and another slot 22, at its lower end, for attachment to a rod 24. The rods 21 and 24 project into the chute or guideway 25 and are spaced so that one is above and the other below a button. As the upper rod 21 is moved outwardly, a button drops onto the lower rod. Since the two rods are attached to each other through the member 19, the lower rod moves inwardly as the upper rod moves outwardly, and vice versa. Hence, when the body part 3 engages the raised upper end 10 of the curved member 8, the member 12 is moved downwardly in opposition to the spring 26, which moves the lower rod outwardly and the upper rod inwardly, the upper rod holding the caps above the lowermost one, and the lower rod permitting the lowermost cap to drop into alignment with the body being presented to the cap feeding mechanism. When the body part 3 passes beyond the end of the curved member 8, the spring 26 raises the member 12 and reverses the position of the rods 21 and 24, so that another cap is dropped onto the lower rod 24. A set screw 27 serves as an adjustable stop for the upward movement of the member 12. It will be noted that the rods 21 and 24 are positioned at the side of the chute so that they will not abut against the caps, but project between the caps.

A more serious objection to the present machines is occasioned by the failure of the cap feeding mechanism to deliver a button to each body part because, in that case, the body part continues around and the ejector mechanism is not effective to remove the body part from the machine because the ejector presses against the cover part; and if there is no cover part it is ineffective. As a result, the body part eventually starts around a second time and when a second body is delivered to the same member 2, both bodies are demolished and, in some cases, the machine is damaged. In all cases, the machine has to be stopped and considerable effort made to remove the demolished bodies. When the button feeding mechanism fails to deliver a cap, it is usually because the button supply is exhausted or because the buttons have become jammed in the chute. In either case, no buttons are fed until the difficulty is eliminated. Until the machine is stopped, a series of bodies are presented and no buttons delivered. These bodies are wasted, as well as the time required in removing the several bodies which have not received buttons from the members 2. If the machine is not stopped quickly, breakage of parts may result.

The mechanism for eliminating this difficulty is shown more particularly in Figs. 1, 2, 4, 5, 6 and 7. A feeler or detector 28 is pivoted in bearing 29 and has on its end a keyed sleeve 30, having an arm 31 with a spring 32 attached to the end of the arm tending to hold the end of the feeler away from the chute or guideway 25, for the caps (Fig. 4 and 5). An extension 34 is provided on the reciprocating rod 6, which inserts the buttons in the body parts of the caps, and a pin 35 is secured in an aperture of the extension and held in extended position by a spring 36. The outer end of the pin 35 extends through a guide bearing 37 and is adapted to engage an extension or arm 38, which is integral with the sleeve 30 and operatively connected to the feeler 28. Each time the rod 6 is reciprocated inwardly to force the button in the body part of a closure cap, the extension 34, through the intermediation of the spring 36, forces the pin 35 against the arm 38, pressing the feeler 28 into the guideway or chute 25 for the closure caps. If there is a button in the guideway, the end of the feeler engages the button and the spring 36 is compressed so that the arm 38 can be pressed outwardly only a predetermined amount. However, if there is no button to engage the end of the feeler 28, the arm 38 is pressed outwardly a greater distance than if the end of the feeler 28 engaged a button and this additional movement of the arm 38 engages and raises a rocker arm 40, which has a set screw 41 to determine the desired relation between the rocker arm 40 and the arm 38 to obtain best results. The rocker arm 40 is pivoted at 42 on one arm of the bell crank 43 which, in turn, is pivoted at 44. When the arm 38 engages the set screw 41 on the rocker arm 40 and raises this arm to the position shown in Fig. 6, the end of the rocker arm is in alignment with and engages the end of a pin 45, secured to the reciprocating extension 34. The entire power of the machine reciprocates the pin 45 and, when the end of the rocker arm 40 engages this, it is forcefully moved against the bell crank 43 to move the latter about its pivot 44. The bell crank 43 is operatively connected to the clutch for stopping and starting the machine, through the arm 46 of the bell crank pivoted to a vertical link 47, which is, in turn, pivoted to a horizontal lever 48, having its end attached to a lever 49 (Fig. 7) pivoted on a shaft 50, with its opposite end 51 (Fig. 5) serving as a latch to hold the clutch in operative position. A spring 53 holds the latch member 51 in effective position. The clutch may be operated manually by means of the lever 52 (Figs. 1 and 4). A spring 54, (Fig. 1) attached to the lever and to the machine, tends to hold the lever 52 so that the machine will not be connected to the source of power. An annular recess 55 (Figs. 1 and 5) is provided in the rod 56 leading to the clutch lever arm, and the latch member 51 normally rests in this annular recess 55, and prevents the spring 54 from pulling the lever 52 to move the clutch into inoperative position.

When the pin 45 engages the rocker arm 40, and rotates the bell crank 43, the lever 48 is rotated about its pivot 65 to raise one end of the lever 49 and to lower the latch member 51, which releases the rod 56 and permits the spring 54 to shift the clutch into inoperative position so that the power is cut off from the machine which, of course, stops immediately. In this manner, the machine is stopped the instant that a button fails to be presented to the body part on the turret member 2. The operator then merely has to supply additional caps or to agitate the caps in the chute 25 and to operate the feed mechanism manually to deliver a button in position to be inserted in the body part failing to receive a button. The machine is then ready to be started again by means of the clutch lever 52. Practically no time is lost and there is no waste of material and no chance of any of the parts becoming jammed or otherwise impaired.

In some instances, the assembled cap and button are not removed from the machine by the ejector 11. This may be by reason of the fact that no button has been delivered to the body part, since the ejector 11 engages only the button of a cap and is not effective to remove a body part not attached to a button, or because the body part fits too tightly on the member 2, or for any other reason. A detailed view of a mechanism is shown in Fig. 8, for minimizing the effects of the ejector's failure to remove a cap or body. This mechanism may comprise a lever 59 (Figs. 2, 4, and 8), pivoted at 59, with its upper end having an extension 57 thereon positioned so that it will normally clear the ends of the members 35, 2 on the turret when they pass without a body part on them, but sufficiently close to the ends of these members so that a body part will engage the member 57 and oscillate the lever 59 in opposition to spring 58. This, in turn, rotates shaft 50 through link 63 and arm 60, secured thereto. The shaft 50 has a sleeve 61 (Fig. 2) keyed thereto and an extension 62 on the sleeve, which is operatively connected to one end of a lever 64, pivoted at 65, with its other end 66 attached by means of a spring 67 to the rocker arm 40. When the body of the cap on the turret member 2 engages the extension 57, the shaft 50 is rotated through the arms 59 and 60 and link 63. This, in turn, raises the arm 42 on sleeve 61, keyed to the shaft 50, and raises one end of the lever 64 about its pivot 65 to lower the other end 66 and pull downwardly the rocker arm 40 by means of the spring 67, causing the opposite end of the rocker arm to be pulled upwardly into the path of the pin 45. This automatically operates the latch member 51 in the same manner as described above with respect to the feeler 28. If desired, the shaft 50 may be utilized to operate the stopping mechanism without utilizing the power of the machine as described in the preferred embodiment.

When the rocker arm 40 is tilted by spring 67 operated by the mechanism at the ejector station, it is desirable to provide means to hold the rocker arm in effective position until the pin 45 engages the rocker arm to stop the machine. This is not necessary in connection with the "no button" stop since the pin 35 is effective on the rocker arm during the entire inward movement of the pin 45. One way of achieving this result is to provide a bracket 70 having a pin 71 normally held against the rocker arm 40 by a light spring 72. A knob is threaded to the other end of the pin. When the rocker arm 40 is tilted above the pin 71, the spring 72 forces the pin under the rocker arm to lock it in effective position until it is normally released by the operator by means of the knob 74.

A more desirable means of accomplishing the same result is to eliminate the parts numbered 70 to 74 and utilize a friction collar or sleeve on the shaft 50. As shown in Fig. 8, a split collar 75 is bolted to the framework of the machine at 76. Preferably, a packing 77 of asbestos or the like is utilized and the pressure on the packing is adapted to be adjusted by means of the bolt 78. By adjusting the pressure on the packing, the shaft 50 may be held in position to maintain the rocker arm 40 tilted until the shaft 50 is normally rotated by pressure on the lever 59 or 60, to return the rocker arm 40 and member 57 to their normal position. In this manner, the rocker arm 40 is held in tilted position until the machine stops.

In the operation of the machine, strips of metal are stacked in the magazine 1 and are delivered as seamed cylindrical body parts to the members 2 of the turret 4. The turret moves these body parts 3, step by step, around into alignment with the feeding chute 25. In moving over to this station, the protruding end of the body part 3 engages the curved member 8 and presses the member downwardly which, in turn, presses downwardly the member 12 (Fig. 3) in opposition to spring 26 and, by means of the link 15, arm 16, shaft 17, and member 19, projects the upper rod 21 into the path of the caps in the chute and retracts the rod 24 to release the lowermost cap. In this way, a cap is fed into alignment with the body part on the member 2. The reciprocating rod 6 forces the button into the body part. In the event that the buttons have become clogged and there is no button at the bottom of the chute to be fed for assembly with a body part, the feeler 28, actuated by means of the pin 35, resiliently held in position on the extension 34 by means of the spring 36, will move inwardly further than it would if a button were in position to oppose its movement. This additional inward movement occasioned by the absence of the button, causes the arm 38, operatively attached to the feeler, to engage the set screw 41 to rock the rocker arm 40 and raise one end of the rocker arm into the path of the reciprocating pin 45. When the reciprocating pin 45 engages the end of the rocker arm, it operates the machine clutch to stop the machine, through rocker arm 40, line 47, lever 48, pivoted at 65, and lever 49 pivoted at 50 (loose), with its other end 51 serving as a latch to hold the clutch in operative position in opposition to the spring 54. If no button is in position to be fed, the machine, as described above, automatically stops so that the operator may dislodge the buttons jammed in the chute or correct any other contingency which prevents the buttons from being fed. Thereafter, by manually operating the button feeding mechanism or by removing the body part from the member 2, the machine is ready to be connected again to the source of power by means of the clutch lever 52. The combined button and body part are then stepped around to the chuck 7, which forms an interfolded seam between the button and the body part to secure these members together. The assembled article is then ejected by means of the ejector 8 and rolls down a chute to another machine where the cap is threaded for application to a bottle.

Should the ejector 11 fail to remove the cap from the member 2, the protruding end of the cap will engage, in its movement to the body receiving station, the extension 57, and rotate shaft 50 by means of the lever 59 pivoted at 56, link 63, and arm 60 keyed to shaft 50. The other end of the shaft 50 has an arm 62 secured thereto, which will be raised to raise one end of the lever 64, pivoted at 65, and this, in turn, lowers the opposite end 66 of the lever and, through spring 67, pulls downwardly the rocker arm 40 to place the opposite end thereof in line with the reciprocating pin 45, in the same way that the feeler 28 operates the rocker arm 40 for the same purpose, that is, to stop the machine. Either the friction collar 75 or the latch pin 71 may be utilized to hold the rocker arm 40 in tilted position until the machine stops.

It will be seen that the present invention improves the operation of machines used for the manufacture of articles such as two-piece closure caps. It minimizes breakage of machine parts, decreases the length of the periods that the machine is shut down, and minimizes the attention required from an operator. The operator is immediately warned of any failure of the various mechanisms to operate in their usual manner so that he can quickly adjust the necessary mechanism. In the event that there is no body presented to the button inserting station, the button feeding mechanism does not feed a button. The failure of the button feeding mechanism to feed a button automatically, stops the machine. These savings, both of time and material, and the increase in the daily production of the machine materially reduce the cost of the articles. The various mechanisms are rugged in character and fully capable of withstanding the rough usage to which they may be subjected.

As various changes may be made in the form, construction and arrangement of parts without departing from the spirit and scope of the invention and without sacrificing its advantages, it is to be understood that all matter herein is to be interpreted as illustrative and not in a limiting sense.

Having thus described my invention, I claim:

1. In a cap assembly device of the class described, the combination of means for feeding buttons and the like to be assembled with body parts, a turret having members adapted to extend into body parts and to present said body parts to be assembled with the buttons fed, said body parts being adapted to protrude from the ends of said turret members, and means operatively connected to said feeding means for engaging the protruding end of a body part on one of said turret members to operate said feeding means to deliver a cap to be assembled with said body part.

2. In a device of the class described, the combination of means for releasing buttons one at a time to be assembled with body parts, a turret having members thereon adapted to extend into and support body parts with one end thereof protruding therefrom and present them at a station for assembly with the buttons, and a feeler operatively connected to the button feeding means and positioned to be engaged by the protruding end of a body part on a turret member having a body thereon to operate the mechanism to feed a button and positioned not to be engaged by a turret member not having a body part thereon.

3. In a device of the class described, the combination of a delivery chute for feeding buttons to be assembled with body parts, devices for releasing said buttons one at a time, a turret having members thereon adapted to extend into and support body parts and position them to be assembled with said buttons, said turret members extending only partially through said body parts, and a feeler positioned adjacent the path of the outer end of the turret member to be engaged by the protruding end of a body part to operate the feeding mechanism, said feeler being positioned not to be engaged by a turret member not having a body part thereon.

4. In a device of the class described, the combination of a turret having members adapted to extend into and support body parts, means operated by said body parts to feed a button to be assembled with the body part only when a body part is on one of said members, mechanism for stopping said machine when a button is not in position to be presented to the body part, means for assembling said button and body part, means for ejecting said button and body part, and mechanism for stopping said machine when said ejecting mechanism fails to eject a body part.

5. In a cap assembling device of the class described, the combination of a turret having members thereon adapted to extend into and support body parts, devices for inserting buttons into said body parts, means for assembling said body parts and buttons while said body parts are on said members, means for ejecting said assembled buttons and body parts from said members, and means effective when said ejecting mechanism fails to eject a body part for stopping the machine.

6. In a device for assembling body parts and buttons, the combination of a clutch for stopping and starting a machine, a lever for releasing said clutch to stop the machine, a reciprocating member, and means operatively connected with said lever normally out of the path of said reciprocating member, and devices responsive to body parts having no buttons therein for bringing said means into the path of said reciprocating member to stop the machine.

7. In a machine for assembling buttons and body parts, the combination of a clutch for stopping and starting a machine, a lever for releasing said clutch to stop the machine, a reciprocating member, and means operatively connected with said lever normally out of the path of said reciprocating member, and devices responsive to unejected body parts for bringing said means into the path of said reciprocating member to stop the machine, and means responsive to the buttons being fed for bringing said member into the path of said reciprocating member to stop the machine.

8. In a device of the class described, the combination of means comprising a plurality of members adapted to receive and support body parts of closure caps, means for attaching buttons to said body parts, means for engaging the attached button to remove the body part from said members, and means for indicating when ejector mechanism fails to remove a body part.

9. In a device of the class described, the combination of a turret having a plurality of members adapted to receive and support body parts, means for attaching buttons to said body parts, means for ejecting the assembled buttons and body parts, and a feeler mounted adjacent the ejecting station to indicate the failure of said ejector to remove a body part from one of said members.

10. In a device of the class described, the combination of a turret having a plurality of members adapted to receive and support body parts, means for attaching buttons to said body parts, means for ejecting the assembled buttons and body parts, a feeler mounted adjacent the ejecting station, a reciprocating member, a pivoted member, and means operatively connected to said feeler and to said pivoted member to move said pivoted member into the path of said reciprocating member to stop the machine when said feeler is engaged by a closure not ejected from the machine.

11. In a device of the class described, the combination of a turret having members thereon for extending into and supporting body members to be assembled with end parts, a chute for feeding end parts to be assembled with said body parts, and arcuate means mounted adjacent the path of said turret members adapted to be engaged by the ends of the body members and operated thereby to release the end parts in said chute one at a time.

12. In a device of the class described, the combination of a turret having members thereon adapted to extend into body members in closure caps and to support and present said body members for assembly with end parts, a chute for feeding end parts to be assembled with said body members, means operated by the protruding ends of said body parts for releasing end parts in said chute one at a time, a feeler adapted to engage end parts about to be released, and means for moving said feeler toward an end part, said means being adapted to stop the machine if an end part is not in the path of the feeler to limit the movement thereof.

13. In a device of the class described, the combination of a turret having a plurality of members adapted to extend into and support body members for closure caps, said body members protruding beyond the end of said turret members, means mounted adjacent said turret members in the path of the protruding ends of said body members to be operated thereby, a chute for buttons, a pair of pins adapted to be projected into said chute and operatively connected to each other, and means operatively connected to said pins and to said means mounted in the path of the protruding ends of the body members to remove one pin from said chute and to insert the other in said chute to release a button as a body part passes said means mounted adjacent to the path of the turret members.

14. In a device of the class described, the combination of a turret having members thereon adapted to telescope into and to support body parts for closure caps, means for stopping and starting said turret, mechanism for feeding buttons one at a time to be assembled with the body parts on said turret, means normally effective to operate said stopping means for stopping the turret periodically, and a feeler adapted to be moved toward a button about to be fed and adapted to be stopped by said button to render said stopping means ineffective.

15. In a cap assembling device of the class described, the combination of a turret having substantially horizontal members thereon adapted to support and transfer assembled body parts and buttons for two-piece closure caps, means for removing the assembled buttons and body parts therefrom, said means being ineffective on body parts without assembled buttons, and means adjacent the path of said members operated by a body part on said members with or without a button therein to stop the machine when the discharge mechanism does not remove a body part from said member.

16. In a device of the class described, the combination of members for extending into and holding a body part, means for placing body parts onto said members, means for assembling buttons with said members, means for ejecting said body parts with buttons therein from said members, said means being ineffective on body parts without buttons, mechanism adapted to stop the machine, and a member adjacent the path of said members adapted to be engaged by a body part which is not ejected to operate said stopping mechanism.

17. In a machine for assembling body parts and buttons of closure caps, the combination of a turret having members thereon adapted to extend into and receive body parts, means for inserting buttons into said body parts, a clutch for stopping and starting said machine, mechanism for operating said clutch to stop the machine, means adapted to engage the attached button to eject the closure cap, and means for stopping the machine when the ejector fails to remove a body part due to the absence of a button.

18. In a machine for making two-piece closure caps, the combination of supporting means adapted to extend into a substantially cylindrical skirt part, means for moving said supporting means to present the skirt part to a cover part, means for assembling the cover part and the skirt part, means associated with said supporting means adapted to engage the cover part when assembled with a skirt part to remove the assembled parts from said supporting means, and mechanism adapted to stop the machine when said removing means fails to remove the body part from said supporting means.

19. In a device of the class described, the combination of a turret having members thereon adapted to extend into and support body parts to be assembled with end parts, means for rotating said turret to present the body parts to the end parts, a guide-way for feeding end parts, a feeler adapted to engage the end parts as they pass a predetermined point, means for forcing said feeler against a button moving along said guideway and mechanism operatively connected to said feeler to stop rotation of said turret when a button is not in the path of said feeler to hold the feeler in opposition to said forcing means.

20. In a device of the class described, the combination of a turret having a plurality of members thereon extending into the body portions of closure caps, said members conforming substantially to the inner periphery of the body portions to form a support for the body portions, means for attaching a button to said body portions, means for removing the body portions from said members by engaging a button attached to the body portions, and mechanism adapted to subsequently stop said machine when said attaching means fails to attach a button to a body part.

ERIC WICKMAN.